H. K. RAYMOND.
BEAD FOR PNEUMATIC TIRES.
APPLICATION FILED JUNE 12, 1912.
1,184,691. Patented May 23, 1916.
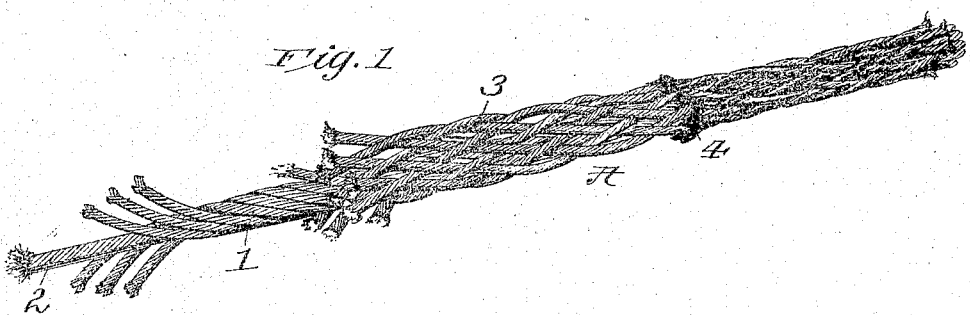
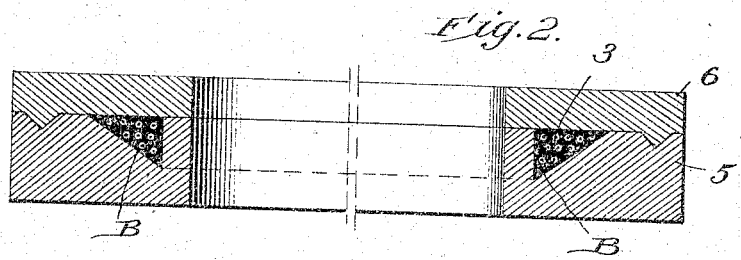
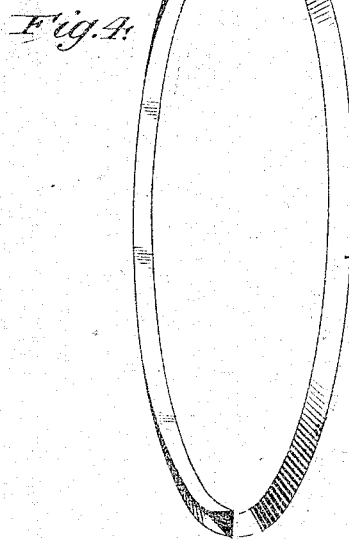
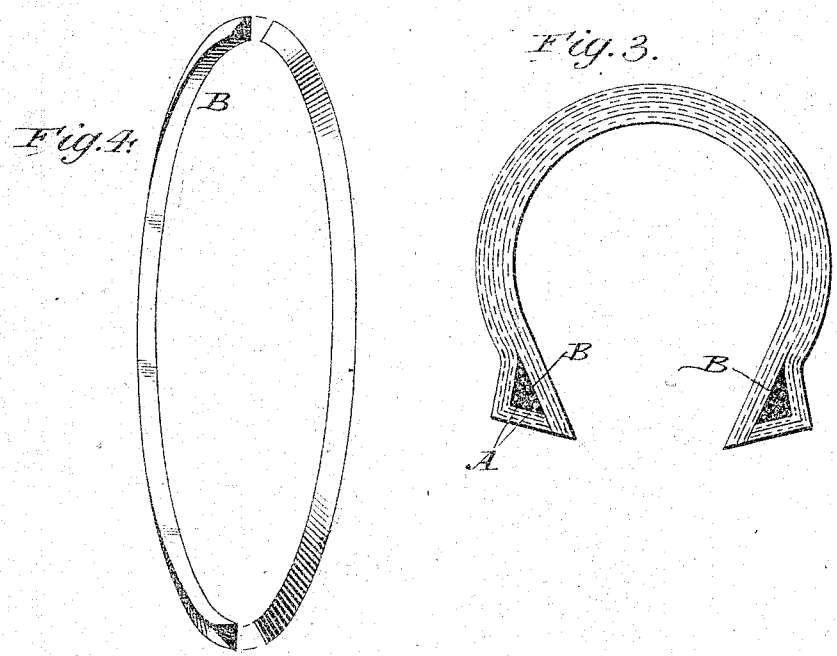
WITNESSES
INVENTOR
Harry K. Raymond,
by Dodge and Sons,
Attorneys.

UNITED STATES PATENT OFFICE.

HARRY K. RAYMOND, OF AKRON, OHIO, ASSIGNOR TO THE B. F. GOODRICH COMPANY, OF AKRON, OHIO, A CORPORATION OF OHIO.

BEAD FOR PNEUMATIC TIRES.

1,184,691.　　　　Specification of Letters Patent.　　Patented May 23, 1916.

Original application filed January 12, 1911, Serial No. 602,248. Divided and this application filed June 12, 1912. Serial No. 703,189.

*To all whom it may concern:*

Be it known that I, HARRY K. RAYMOND, a citizen of the United States, residing at Akron, in the county of Summit and State of Ohio, have invented certain new and useful Improvements in Beads for Pneumatic Tires, of which the following is a specification.

My present invention pertains to an improved bead for pneumatic tires.

The bead or bead-core hereinafter described is composed in part of rubber and is inextensible, by reason of the fact that the convolutions of wire or wire cable employed are wound under tension. It is highly desirable that the reinforcing wire should be wound in the bead under tension, and that the convolutions should not thereafter shift on each other in order that all portions and turns of the wire may be in proper condition to take up the strain to which the bead is subjected when in use in a tire, for if the wire be loosely wound, or should become loosened, some portions thereof will be more slack than others, and the bead will not only be somewhat extensible, but will be weakened by reason of the fact that not all of the wire will, at the same time, be acting to resist the strain, but the tighter portion would be subjected to the greater strain, and if those portions do not break but stretch so as to bring strain on the looser portions also, the movement of the parts further weakens and soon destroys the bead.

A prominent difficulty in making beads of this character, composed of wire under tension in a body of rubber, arises from the fact that, when the rubber becomes heated and consequently soft in the process of vulcanization, the wire cuts through the rubber, or the rubber flows by the wire, with the result that the wire moves from the positions which it was intended and designed to occupy in the bead. Further, such movement is irregular and some of the convolutions of wire, or portions thereof, become slacker than others, which is objectionable, as above explained.

In the production of my improved bead the wire or cable which gives strength to the bead is wound in its desired position under tension, and is so constructed and treated that the various convolutions of the wire or cable more securely maintain their positions in, and adhere more firmly to the finished article, with the result that a highly efficient bead is produced. Said bead and the apparatus which may be used in constructing the same are illustrated in the accompanying drawings, wherein:

Figure 1 is a perspective view, portions being broken away, of the textile-covered wire or cable employed in building up the bead; Fig. 2 a sectional view of a press or mold in which the bead-strip is cured; Fig. 3 a sectional view of the shoe or casing of a tire, with the bead applied thereto; and Fig. 4 a perspective view of one of the complete beads.

The wire or cable, designated as a whole by A, which is placed in a number of convolutions in the bead B, is provided with a textile or equivalent covering and is shown enlarged in Fig. 1. In said figure, 1 represents the wire or strands of the cable, each strand being preferably formed of a series of wires, the main strand being wound about a central core or cord 2. The textile covering which I prefer to use is formed by braiding, thus forming a covering 3, said covering fitting loosely around the cable. The covering is subsequently treated with a thick rubber cement, as indicated at the right-hand portion of Fig. 1, the rubber-treated portion being designated by 4; or the cable may be run through a rubber solution and the textile covering then put on, or the textile material may be impregnated with rubber in other ways. The cable thus produced is wound under tension on a suitable support and then placed in an annular groove formed in the member 5 of a vulcanizing press or mold, said groove being of such cross-section as may be desired, depending upon the kind and shape of tire in which it is to be used. In the drawings I have shown the bead as substantially triangular in cross-section. The convolutions of the wire or cable thus wound under tension maintain exactly those positions which it is desired that they shall occupy in the finished bead, the convolutions of the cable proper being spaced away from one another by the rubber-coated textile sheathing or casing which casing maintains the convolutions in their proper position during the process of vulcanization. Said casing or sheathing likewise has the effect of preventing the softened rubber from shifting its position during vulcanization, or of preventing the wire from shifting its position in the softened rubber. Furthermore, the presence of the rubber and textile material reduces the amount of wire required to give the bead-core a certain size, and contributes something to its strength. After the bead has been built up to the requisite size and placed in the groove of the mold, the top of 6 of the mold or press is put in position and the whole subjected to heat sufficient to secure the degree of vulcanization desired. The bead-core is then removed from the mold and built into the tire in the usual way, as indicated in Fig. 3. This view represents a well-known type of pneumatic tire casing known as the straight-side type, in which the bead-core is located between the lower margins of the inner and outer fabric layers of the carcass. It is found that a core of this improved construction, by reason of the rubberized fabric covering of the wire cable, has a better adhesion to the carcass layers than one made with a bare wire embedded in rubber, and reduces the tendency of the two parts of the carcass to separate at the upper corner of the bead, which is a common fault in most tires employing inextensible beads.

It has been found by actual use that the convolutions maintain their positions during the process of vulcanization, and this is brought about by the employment of the casing 3, or its equivalent, which prevents the parts from shifting when the winding or the vulcanization is being effected or when the tire is in use.

The rubber applied to the cable-casing is usually sufficient in quantity to completely fill the mold, but if necessary an additional amount may be applied previously to the closing of the mold.

In practice it may be found desirable to apply a sheet of fabric to one or more sides of the bead thus produced, but this is not of the essence of the invention and is not shown herein.

By forming the bead in the above-described manner the various convolutions of the cable will be free from kinks, or slack portions, or the like, and there will be no tendency for the parts to bulge or break out, nor, while the bead is being formed, of the convolutions to shift their position and thereby cause a weakening of the bead in the manner hereinbefore described.

Inasmuch as the bead is continuous, and there is no way of ascertaining the position of the component parts thereof except by the destruction of the bead, it is essential to the production of a uniform product that a process be employed which will admit of the parts being properly positioned in the first place and thereafter, during the remainder of the process, maintained in such position.

This case is a division of my application Serial No. 602,248, filed January 12, 1911, for the process of forming a bead of the described character.

Having thus described my invention, what I claim is:

1. As a new article of manufacture, an annular bead for tires, composed of a wire cable inclosed in a rubberized textile sheath and wound in a plurality of adhering convolutions which are maintained in fixed relation by the rubber and textile material.

2. As a new article of manufacture, an annular bead for tires, composed of a wire cable inclosed in a rubberized tube of braided fabric and wound in a plurality of adherent convolutions.

3. The combination of a laminated tire carcass, and a bead located between and enwrapped by the layers of said carcass and composed of a plurality of convolutions of wire, substantially inextensible under stress each inclosed in a textile covering and embedded in rubber.

4. The combination of a laminated tire carcass, and a bead of substantially triangular cross-section located between and enwrapped by the layers of said carcass and composed of a plurality of rubber-embedded convolutions of substantially inextensible wire cable provided with a textile sheathing.

5. As a new article of manufacture, a bead for tires, comprising an annular member, the body of which is composed of a cable surrounded by a body of rubber, said cable being composed of a wire member having a fibrous sheathing thereon and being substantially inextensible under stress.

6. As a new article of manufacture, an annular bead for tires, composed of a cable member embedded in rubber, said cable member comprising a plurality of convolutions and formed of wire surrounded by a fibrous rubberized sheathing, said convolutions being substantially inextensible.

7. As a new article of manufacture, an annular bead for tires comprising, in combination, a cable wound in a plurality of convolutions, said cable being embedded in rubber and formed of a plurality of wire strands with a braided, textile, rubberized sheathing placed thereon, said cable, and consequently the convolutions, being substantially inextensible under stress.

8. As a new article of manufacture, a bead for tires, comprising a wire cable having a rubberized fabric sheath thereon, said cable being wound in a plurality of convolutions which contact with each other; and a body of rubber covering said convolutions and filling the spaces between the same.

In testimony whereof I have signed my name to this specification in the presence of two subscribing witnesses.

HARRY K. RAYMOND.

Witnesses:
  CLARENCE S. GREENLESE,
  WALTER K. MEANS.